April 2, 1963  A. R. GILBERT ETAL  3,084,114
IRRADIATED FILLER-CONTAINING POLYETHYLENE
Filed Feb. 15, 1955
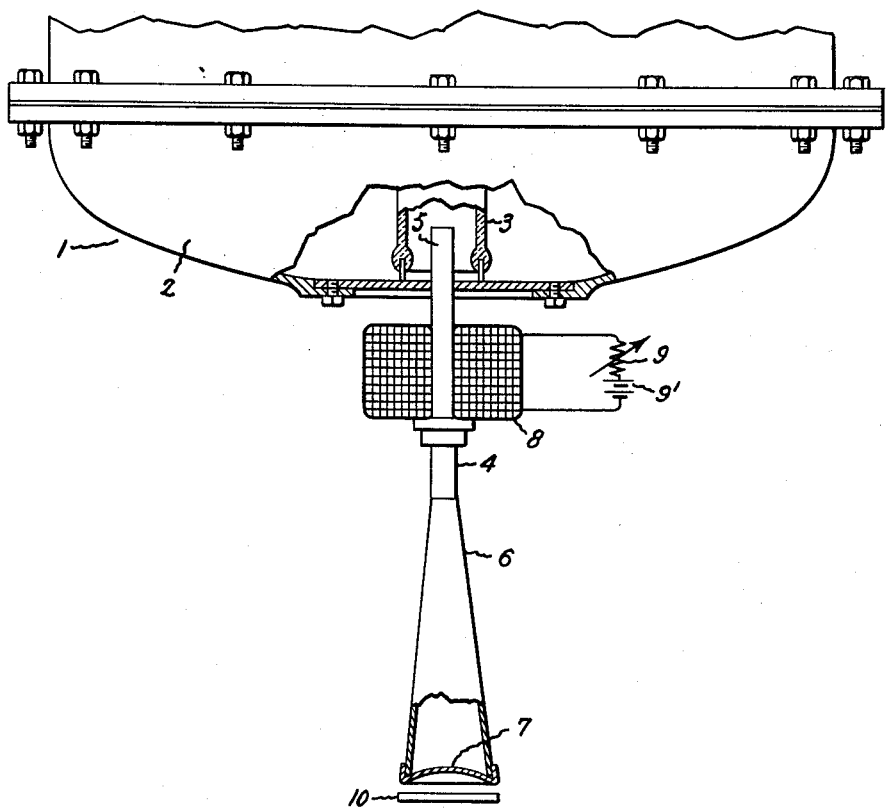
Inventors:
Alfred R. Gilbert,
Frank M. Precopio,
by Paul A. Frank
Their Attorney.

3,084,114
IRRADIATED FILLER-CONTAINING
POLYETHYLENE
Alfred R. Gilbert and Frank M. Precopio, Schenectady, N.Y., assignors to General Electric Company, a corporation of New York
Filed Feb. 15, 1955, Ser. No. 488,304
18 Claims. (Cl. 204—154)

This invention relates to a process which comprises irradiating with high energy radiation a filled (i.e., filler-containing) member of the group consisting of polyethylene and blends of polyethylene with other polymers (hereafter called polyethylene blends). This invention also relates to an irradiated, filled member of the group consisting of polyethylene and polyethylene blends possessing improved properties as compared to the corresponding unirradiated, filled and irradiated, unfilled (i.e., non-filler-containing) compositions.

In the gamut of polymeric materials which have evolved in recent years, polyethylene has proved to be one of the most popular. It has found wide usage as an insulating material, as a container material, as a conduit material, etc. Fabrication, molding, extrusion and calendering of polyethylene are readily accomplished by standard methods, thus facilitating its use for many purposes. Despite all this, however, the applications of polyethylene are greatly limited by its lack of "form stability," i.e., the ability to retain a particular shape at elevated temperatures, and by its poor high temperature properties, such as poor high temperature tensile strength, tear strength, cut-through strength, etc. Although marked improvements in these properties have been obtained by irradiation, further improvements have been effected by the present invention.

The incorporation of fillers in unirradiated polyethylene has been described by Bostwick et al. in "Industrial & Engineering Chemistry" 42, pages 848–9 (1950), where, for example, such fillers as silicas, carbon blacks, clays, calcium carbonate, magnesium carbonate, etc., have been used as fillers. In that publication, it has been shown that the incorporation of fillers in polyethylene markedly increased the stiffness or rigidity of polyethylene. Therefore, it was concluded by the authors that fillers reduced the tensile strength, tear strength, and ultimate elongation of polyethylene and that decreased elongation and decreased tear strength combined to make unirradiated, filled polyethylene less resistant to cracking or breaking when bent sharply, as compared to the unirradiated, unfilled resin.

We have now discovered that irradiated, filled polyethylene possesses improved properties as compared to unirradiated, filled and irradiated, unfilled polyethylene. The irradiation of filled polyethylene has resulted in a polyethylene of increased flexibility, tensile strength, percent elongation, tear strength, impact strength, and flexural strength as compared to unirradiated, filled polyethylene. Furthermore, the irradiation of filled polyethylene has also resulted in markedly improved high temperature properties, such as high temperature tensile strength, high temperature tear strength and high temperature cut-through strength as compared to irradiated, unfilled and unirradiated, filled polyethylene.

The polyethylene referred to herein is a polymeric material formed by the polymerization of ethylene at high temperatures and low and high pressures. It is described in Patent 2,153,553—Fawcett et al., and in "Modern Plastics Encyclopedia," New York 1949, pages 268–271. Specific examples of commercially available polyethylene are the polyethylenes sold by E. I. du Pont de Nemours & Co., Inc., Wilmington, Delaware, examples of which are "Alathons 1, 3, 10, 12, 14," etc., those sold by the Bakelite Company, such as DE-2400, DYNH, etc., and the Phillips Petroleum Co. polymers, such as Marlex 20, 50, etc. Other polyethylenes of various molecular weights are described by Lawton et al. in "Industrial and Engineering" 46, pages 1703–1709 (1954).

In the drawing, there is shown high voltage accelerating apparatus 1 capable of producing a beam of high energy electrons for irradiating polymeric materials in accordance with the invention. High voltage accelerating apparatus 1 may be of the type disclosed in Patent 2,144,518—Westendorp, assigned to the same asignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of eletrons is accelerated down envelope 3 once during each cycle of the energizing voltage when the upper extremity of the inductance coil is at a negative potential with respect to the lower end. Further details of the construction and operation of high voltage acelerating apparatus 1 may be found in the aforementioned Westendrop patent and in "Electronics," vol. 16, pages 128–133 (1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing irradiated, filled polyethylene according to the invention, a sheet 10 of filled polyethylene can be supported in the path of the electrons emerging from end-window 7 as illustrated. The high energy electrons penetrate the polymeric material to a depth dependent upon their energy and effect the above modifications in the properties of the material. Of course, sheet 10 can be in the form of strip material which is passed continuously under end-window 7 at a velocity selected to give the desired irradiation dosage. Other expedients for obtaining the irradiation of the polymeric materials in various shapes (e.g., bottles, cups, tubing, filaments, pipes, etc.) will be apparent to those skilled in the art. If the polymeric materials are initially in liquid or semi-liquid form, suitable receptacles for containing them can be utilized. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton or xenon, etc., to prevent the damaging effect of any corona which may be present.

The measure of the amount of irradiation is a Roentgen unit (r.) which, as usually defined, is the amount of radiation that produces one electrostatic unit of charge per milliliter of dry air under standard conditions and, as employed herein, refers to the amount of electron radiation measured with an air equivalent ionization chamber at the position of the upper surfaces of the polymeric materials.

Irradiation can be carried out below room, at room, or at elevated temperatures.

A large variety of fillers can be used in our invention. The most desirable fillers are those which are capable of enhancing the elevated temperature properties of irradiated polyethylene. As a class, inorganic and carbonaceous (i.e., colloidal carbon) fillers give excellent results. Inorganic fillers also include inorganic fillers which have been rendered hydrophobic with organic groups, such as surface-esterified silicas, trimethylchlorosilane-treated silicas, etc. Examples of such inorganic and carbonaceous fillers are silica xerogels, silica aerogels, fumed silicas, hydrophobic silicas, metal silicates, such as calcium silicate, etc., titanium dioxide, zinc oxides, metal carbonates, such as calcium carbonate, magnesium carbonate, etc., boron compounds, such as boron oxides and carbides, carbon blacks, etc. Of the class of inorganic and carbonaceous fillers, silicas, aluminas, calcium silicates and carbon blacks are preferred. As a general rule, it is desirable to use a filler having a surface area of about one or more square meters per gram but preferably more than about 40 square meters per gram.

A class of silicas useful for our invention are those having numerous pores or voids therein. These porous materials having exposed surfaces within the particles so that liquids and gases can penetrate to the surfaces of the pore walls are three-dimensional networks whose surfaces are extended by open pores.

The preparation of high surface area silicas and the chemical changes that occur when silicic acid goes to silica gel or hydrated silica are described in "Natural and Synthetic High Polymers," by K. M. Meyer, page 85 (1942), and in Hurd, "Chemical Reviews," vol. 22, No. 3, page 403 (1938).

A typical method of preparing precipitated silica comprises precipitating silica by the addition of $H_2SO_4$ to a sodium silicate solution and working the gel relatively free of salts with water. If water is evaporated from the gel in this state, the latter shrinks considerably in volume due to the force exerted on the solid phase of the gel by the surface tension of the liquid as it recedes in the pores of the material. These materials, which are called xerogels, can be used in this process.

In contrast to xerogels, aerogels are composed of the original solid phase gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point, the liquid will be converted into the gaseous state without the formation of menisci at the gas-liquid interface. The degree of porosity may be controlled to a large degree by controlling the concentration of the silica in the gel as it is precipitated. These aerogels may be used in this condition or they may be ground to a finer state of subdivision.

An example of an aerogel is Santocel-C marketed by Monsanto Chemical Company which has a specific surface area of about 160 square meters per gram.

Silicas prepared by other methods may also be used, for example, by burning various silicon-containing compounds, such as silicate esters (Patent 2,399,687—McNabb) and silicon tetrachloride. An example of a fumed silica (i.e., prepared from burning $SiCl_4$) is "Cab-O-Sil" (also called Aerosil) which has a surface area of about 200 square meters per gram (Godfrey L. Cabot Inc., Boston, Massachusetts).

In contrast to the above-described hydrophilic silicas (i.e., possessing water affinity) are those silicas which have been rendered hydrophobic by chemical treatment, examples of which are the alkyl surface-esterified type described in Patent 2,657,149—Iler, of which the butyl ester is marketed as Valron (also called G.S. Silica) by Du Pont Chemical Company and silicas which have been treated with various alkyl chlorosilanes in the manner of Patents 2,510,661, 2,563,555, both granted to Safford and assigned to the same assignee as the present invention, and 2,584,085—Stross.

Silicas prepared by various methods may be treated with heavy metal salts or hydrous heavy metal oxides to prepare heavy metal silicates which are water insoluble and usually amorphous. An example of a precipitated hydrated calcium silicate containing aggregates of particles of the order of 30-50 m$\mu$ is described in "Chemical and Engineering News" 24, page 3147 (1946), and marketed as "Silene EF" by Columbia Chemical Division of the Pittsburgh Plate Glass Company.

Another type of filler that can be used is alumina, high surface area alumina being preferred. Among these high surface area compounds are such aluminas as (1) hydrated aluminum oxide (C–730) made by Aluminum Company of America which comprises 34.7% combined water and 64.4% $Al_2O_3$ (chemically aluminum trihydrate) and is of an average particle size of about 0.5 micron, (2) activated (dehydrated) aluminum oxide which is dehydrated C–730 obtained by heating for 64 hours at 480° F. to remove 28% of the combined water, (3) activated (dehydrated) alumina produced by calcining at elevated temperatures to remove essentially all the combined water, (4) alpha alumina, made by Linde Air Products Company, average particle size of about 0.3 micron, (5) gamma alumina, such as Alon I, manufactured by Godfrey L. Cabot, Inc., of Boston, Massachusetts.

Gamma alumina ($Al_2O_3$) having a certain crystalline structure is prepared in such a way that it is different from most of the common aluminum oxides now available. One method of preparing gamma alumina is to vaporize the anhydrous aluminum chloride by heating it, said heating being carried out with natural gas. The water formed as a result of the combustion hydrolyzes the aluminum chloride in the vapor state, which at a temperature of about 500° F. (which characterizes the low temperature designation of the gamma alumina) dehydrates and converts to a fine particle size gamma aluminum oxide which is then collected and freed of excess hydrogen chloride. The average particle size of this particular alumina (as shown by agreement between electron microscope examination and nitrogen adsorption methods) is very small and is for the most part less than about 100 millimicrons in size, average particle size being from about 20 to 40 millimicrons. The particles are generally of uniform size and shape and the surface area of the gamma alumina is within the range of from about 40 to 130 square meters per gram. Another method for making this gamma alumina is to vaporize anhydrous aluminum chloride and hydrolyze it in the vapor state with high temperature steam, whereby the actual hydrolysis takes place preferably at around 500° F. The gamma alumina, having a hazy X-ray gamma structure, undergoes a change to a sharp gamma structure as the temperature is raised progressively up to around 900° C., where a transition to a sharp alpha pattern takes place. More detailed information regarding gamma alumina may be found disclosed in the article by M. H. Jellinek and I. Fankuchen, "X-ray Diffraction Examination of Gamma Alumina" in "Industrial and Engineering Chemistry," page 158, February 1945.

Many types of finely divided carbon blacks can be used in our invention, such as animal or vegetable, channel, furnace and thermal carbon blacks, etc. A good description of the preparation of carbon blacks is contained in Faith et al., "Industrial Chemicals," pages 174–182, published by John Wiley & Sons, New York (1950). Among the various grades of suitable carbon blacks are channel; channel, conducting; channel, hard processing; channel, medium processing; channel, easy processing; furnace, conducting; furnace, fine; furnace, high modulus; furnace, high elongation; furnace, reinforcing; furnace, semi-reinforcing; thermal fine; thermal medium; acetylene; lampblack; etc.

A partial list of some of the fillers useful in our invention is presented below in Table I.

of 1819 p.s.i. (note Table II). Similarly, while an irradiated, unfilled polyethylene had a room temperature tensile strength of 3230 p.s.i. and a high temperature tensile strength (145° C.) of 131 p.s.i., the corresponding irradiated 30% Aerosil-filled polyethylene has a room temperature tensile strength of 2846 p.s.i. and an elevated temperature tensile strength (145° C.) of 707 p.s.i., about 5.5 times the high temperature tensile strength of irradiated, unfilled polyethylene (Table II).

Other high temperature properties of polyethylene, such as high temperature tear strength and high temperature cut-through strength are improved by the incorporation of fillers in irradiated polyethylene. Although there are but small differences in the tear strength at room temperature, when irradiated, filled polyethylene is compared to irradiated, unfilled polyethylene, a marked increase in tear strength at elevated temperatures is noted. For example, an irradiated 40% Aerosil-filled polyethylene had a high temperature (145° C.) tear strength of 95 pounds per inch as compared to 27 pounds per inch for the corresponding irradiated, unfilled polyethylene, a more than 3.5-fold increase. At the same time, the difference between room temperature tear strength of these is small: 556 for irradiated, unfilled polyethylene and 638 for the irradiated 40% Aerosil-filled polyethylene (note Table VII).

Excellent high temperature cut-through strength is noted for irradiated, filled polyethylene as compared to irradiated, unfilled polyethylene. Thus, in a 30% Aerosil-filled polyethylene tape (10 mils) irradiated with $15 \times 10^6$ r., no cut-through was noted at 250° C. in 20 minutes with a 2-pound load, whereas the corresponding unfilled

TABLE I

| Filler | Description | Particle size, mμ | Source |
| --- | --- | --- | --- |
| Aerosil (Cab-O-Sil) | Fumed silica | 15–20 | Godfrey L. Cabot. |
| Valron | Hydrophobic silica aerogel | 6–7 | Du Pont. |
| Hisil X303 | Precipitated silica | 20–30 | Columbia Southern. |
| Hisil 101 | do | 20–30 | Do. |
| Santocel-C | Silica aerogel | 10 | Monsanto. |
| Hisil 233 | Precipitated silica | 25 | Columbia Southern. |
| Syloid 244 | do | $2-3 \times 10^3$ | Davison Chemical. |
| Silene EF | Hydrated, precipitated calcium silicate | $2-3 \times 10^2$ | Columbia Southern. |
| Clay 33 | Aluminum silicate | $2 \times 10^3$ | Southern Clay. |
| P-33 | Fine thermal black | 170 | R. T. Vanderbilt Company. |
| Micronex W6 | Easy processing channel black (EPC) | | Benney and Smith Company. |
| Phil Black 0 | HAF (high abrasion furnace) | 45 | Phillips Petroleum. |
| Vulcan 9 | SAF carbon black | 60 | Godfrey L. Cabot. |
| Alon C | $Al_2O_3$ (gamma) | 5–40 | Do. |

Fillers have a very pronounced and unpredictable effect on polyethylene. For example, when fillers are incorporated in polyethylene, a slight increase or a reduction in room temperature tensile strength is noted depending on the filler and the molecular weight of polyethylene. However, irradiation of any of these filled samples causes a marked improvement in room temperature tensile strength as compared to unirradiated, filled polyethylene. Furthermore, these samples of irradiated, filled polyethylene exhibit greatly enhanced high temperature tensile strength as compared to unirradiated, filled or irradiated, unfilled polyethylene. For example, an unirradiated, unfilled polyethylene had room temperature tensile strength of 2392 p.s.i. while the corresponding unirradiated 30% Aerosil-filled polyethylene (based on total weight) had a room temperature tensile strength polyethylene tape (10 mils) irradiated to the same dose was completely cut through at 130° C. in less than a minute with the same 2-pound load.

Enhanced high temperature properties are particularly pronounced in our preferred group of fillers, namely silicas, aluminas, calcium silicates, and carbon blacks. For example, in comparison to the high temperature (145° C.) tensile strength of an irradiated, unfilled polyethylene which was about 100 p.s.i., irradiated silica-filled polyethylene is over 800 p.s.i.; irradiated alumina-filled is 340 p.s.i.; irradiated calcium silicate-filled is 332; and irradiated carbon black-filled is 548. Despite this marked increase at elevated temperatures, these same filled polyethylenes, whether irradiated or unirradiated, exhibit only a slight increase or a reduction in room temperature tensile strength as compared to unirradiated or irradiated, unfilled polyethylenes.

Thus, the use of irradiated, filled polyethylene further extends the high temperature application horizon beyond that obtained by irradiation alone. Although the irradiation of unfilled polyethylene has made possible some elevated temperature uses for polyethylene before unknown, the presence of filler in the irradiated composition has further extended the use of polyethylene to even higher temperatures. As of present knowledge, we are unable to explain these greatly enhanced high temperature properties, particularly in view of the slight increase or reduction in room temperature properties of unirradiated, filled polyethylene.

High energy irradiation of filled polyethylene results not only in the improvement of the high temperature properties as described above, but has also resulted in increased flexibility, tensile strength, percent elongation, tear strength, impact strength and flexural strength as compared to unirradiated, filled polyethylene. Although unirradiated, filled polyethylene is very brittle under high filler loadings, this same material after irradiation becomes quite flexible as evidenced by the marked increase in elongation. Thus, although an unirradiated 40% Aerosil-filled polyethylene was so brittle it could not be readily measured for either tensile strength or percent elongation, this same material after irradiation was flexible and had a room temperature tensile strength of 2882 p.s.i., and an elevated temperature tensile strength (145° C.) of 806 p.s.i. coupled with a room temperature percent elongation of 145 and an elevated temperature (145° C.) percent elongation of 150 (Table II).

This effect is also noted with other fillers, such as Alon I, where an unirradiated 30% Alon I-filled polyethylene had a room temperature tensile strength of 1735 p.s.i., a room temperature percent elongation of 475, an elevated temperature tensile strength (145° C.) of 0 and an elevated temperature percent elongation (145° C.) of 800. In contrast, the same material after irradiation had a room temperature tensile strength and room temperature percent elongation of 2008 p.s.i. and 625, respectively, with the same properties at elevated temperatures (145° C.) being 340 p.s.i. and 750, respectively (Table V).

The yield points are markedly increased. Although unirradiated 10% Aerosil-filled polyethylene had a yield point of 1515 p.s.i., the same material after irradiation had a yield point of 1900 p.s.i. (Table VI).

Similarly, room temperature tear strength is improved. Thus, unirradiated 40% Aerosil-containing polyethylene had a room temperature tear strength of 150 pounds per inch while the same composition after irradiation had a room temperature tear strength of 638 pounds per inch (Table VII).

Marked improvement in such important properties as room temperature flexural and impact strength were also noted. Thus, an unirradiated 30% Aerosil-containing polyethylene had a room temperature flexural and impact strength of 3218 p.s.i. and 0.557 foot-pound, respectively, in contrast to the same composition after irradiation which had room temperature flexural and impact strength of 4208 p.s.i. and 0.810 foot-pound, respectively (Tables VIII and IX).

Other types of polymeric materials which either improve the properties of the above-mentioned polyethylene compositions or which do not adversely affect the irradiation process or products can be blended with these filler-polyethylene compositions. In general, those polymers, preferably elastomers, which are capable of being cross-linked by irradiation may be incorporated into the filler-polyethylene composition.

Those unconverted or uncured polymeric compositions which, according to the present invention, may be blended with the filler-polyethylene composition and cross-linked by electron irradiation to polymers of enhanced properties comprise organopolysiloxanes, such as those disclosed and claimed in Agens Patent 2,448,756, Sprung Patents 2,448,556 and 2,484,595, Krieble et al. Patent 2,457,688, Hyde Patent 2,490,357, Marsden Patent 2,521,528, Warrick Patent 2,541,137, etc.; copolymers of butadiene and styrene (where the butadiene, e.g., butadiene-1,3, may comprise from 20 to 80% of the total weight of the butadiene and styrene), an example of which is G.R.S. rubber; copolymers of butadiene and acrylonitrile (where the butadiene may comprise from about 55 to 80% of the total weight of the butadiene and the acrylonitrile), an example of which is Hycar OR rubber; polymeric chloroprene or 2-chlorobutadiene, an example of which is neoprene; polymers of monohydric alcohol esters of acrylic acid, e.g., polymeric methyl acrylate, polymeric butyl acrylate, such polymeric materials ranging from tough, pliable rubber-like substances in the case of the polymeric methyl acrylate to softer and more elastic products in the case of the polymeric, longer chain alkyl acrylates (examples of polymeric alkyl acrylates which may be employed are more particularly described in Semegen Patents 2,411,899, 2,412,475 and 2,412,476) and are sold under the name of, for instance, Polyacrylic Ester EV; polystyrene (either liquid or solid); chlorosulfonated polyethylenes, such as Hypolon S-2 (Du Pont) etc., and natural rubbers, e.g., smoke sheet and natural crepe, etc. Mixtures of these above-described polymeric compositions may also be incorporated into the filler-polyethylene compositions.

An illustration of the unexpected results that fillers produce when incorporated into these blends is demonstrated with an irradiated Aerosil-filled polyethylene-organopolysiloxane blend. In this instance, the incorporation of Aerosil therein raised the high temperature tensile (145° C.) from 70 p.s.i. for the irradiated, unfilled 50 gram-50 gram polyethylene-organopolysiloxane gum to 404 p.s.i. for the same irradiated composition containing 40 grams of Aerosil.

Although neither total dose nor rate of dose is critical as long as the material is sufficiently cross-linked (usually about $5 \times 10^6$ r. or more) we prefer to use a total irradiation dose of about $10 \times 10^6$ r. to $30 \times 10^6$ r. or higher. Although as little as 5% or more of filler based on total weight enhances the properties of polyethylene, it is desirable to have a filler content of 10 to 60%, with the most preferably range being 20–40%.

In order that those skilled in the art may better understand how the present invention may be practiced, the following examples are given by way of illustration and not by way of limitation.

Filler-containing polyethylene was prepared by roll-milling at elevated temperatures a mixture of polyethylene and filler until a homogeneous sheet was produced (about 15–30 minutes). These milled sheets were compression-molded into pieces having the desired thickness, usually 60–100 mils (1 mil=0.001 inch), which sheets were then irradiated to the desired dose. Various measurements of the properties of these filler-containing sheets were taken.

*Tensile strength and percent elongation.*—A very important property that must be taken into consideration in determining the uses to which a plastic may be applied is tensile strength. Tensile strength can be defined as the greatest longitudinal stress a substance can withstand without rupture. It is usually expressed with reference to a unit cross-sectional area, such as pounds per square inch necessary to produce rupture.

A property usually measured at the same time as tensile strength is percent elongation which term can be defined as the total stretch or deformation in the direction of the load, or, stated another way, the per unit length change caused by a tensile force. It is the amount of permanent stretch before rupture expressed as percentage of the original length.

After the filler-containing molded sheets of polyethylene were irradiated to the desired dose, the room temperature tensile samples having thickness of 60–100 mils were die-cut with a conventional dumbbell-type tensile die which was 0.125 inch wide at the narrow region. These samples were tested for tensile strength and percent elongation, using a Scott Tester (Model L–6) having a pulling speed of 2 inches per minute (except where noted). Both tensile strength and percent elongation were measured according to ASTM procedures D412–51T.

The tensile strength was calculated in the usual manner from the pounds of force exerted at break. Percent elongation was determined by measuring the extension at break and comparing this distance with an initial fixed distance.

For high temperature tensile strength tests (145° C.) a larger size die-cut dumbbell-type sample was used for easier manipulations at elevated temperatures (0.250 inch wide at the narrowest region). These samples were tested for tensile strength and percent elongation using a Scott Tester (Model LP) with a pulling speed of 20 inches per minute and equipped with a high temperature conditioning cabinet. Each sample was conditioned for 5 to 10 minutes at the test temperature (145° C.) before being tested.

TABLE II
*Tensile Strength and Percent Elongation*

UNIRRADIATED

| Ex. | Filler | Percent filler based on total weight | Rm. temp., T.S.[1] (p.s.i.) | Rm. temp., percent elong. | 145° C. T.S. (p.s.i.) | 145° C. percent elong. |
|---|---|---|---|---|---|---|
| 1 | Aerosil | 0 | 2,392 | 655 | 0 | High |
| 2 | ---do--- | 10 | 1,722 | 435 | 0 | High |
| 3 | ---do--- | 20 | 1,715 | 280 | 0 | High |
| 4 | ---do--- | 30 | 1,819 | 20 | 70 | Low |
| 5 | ---do--- | 40 | | | | |

IRRADIATED (15×10⁶ R.)

| Ex. | Filler | Percent filler based on total weight | Rm. temp., T.S.[1] (p.s.i.) | Rm. temp., percent elong. | 145° C. T.S. (p.s.i.) | 145° C. percent elong. |
|---|---|---|---|---|---|---|
| 6 | Aerosil | 0 | 3,230 | 475 | 131 | 350–375 |
| 7 | ---do--- | 10 | 2,268 | 325 | 169 | 200 |
| 8 | ---do--- | 20 | 2,630 | 315 | 389 | 200 |
| 9 | ---do--- | 30 | 2,846 | 265 | 707 | 225 |
| 10 | ---do--- | 40 | 2,882 | 145 | 806 | 150 |

[1] T.S.=Tensile strength.

Although a radiation dose of $15 \times 10^6$ r. was used in Table II, other irradiation doses can be used to obtain similar properties in filler-containing polyethylene. Table III shows the properties of unfilled and filled polyethylene as a function of irradiation dose.

TABLE III [1]
*Effect of Irradiation Dose*

| Ex. | Filler | Percent filler based on total weight | Irradiation dose | Rm. temp. T.S. (p.s.i.) | Rm. temp., percent elong. | 145° C. rm. temp. T.S. (p.s.i.) | 145° C. rm. temp., elong. |
|---|---|---|---|---|---|---|---|
| 11 | None | | 10×10⁶ R. | 2,130 | 650 | 86 | 600 |
| 12 | ---do--- | | 15×10⁶ R. | 2,485 | 600 | 75 | 350 |
| 13 | ---do--- | | 30×10⁶ R. | 2,440 | 450 | 129 | 300 |
| 14 | Aerosil | 30 | 10×10⁶ R. | 2,465 | 450 | 411 | 400 |
| 15 | ---do--- | 30 | 15×10⁶ R. | 2,675 | 400 | 476 | 300 |
| 16 | ---do--- | 30 | 30×10⁶ R. | 2,830 | 400 | 596 | 250 |

[1] Pulling rate in all samples was 20 inches per minute.

The following data shown in Table II was obtained using Aerosil (also called "Cab-O-Sil"). Since the composition containing 40% Aerosil was too stiff and brittle to mold by conventional procedures, sheets of this 40% material were obtained by stripping sheets directly off teh roller mill with the thickness of the sheet being controlled by adjusting the spacing between the rolls. The room temperature and elevated temperature tensile strength and elongation of the unirradiated 40% Aerosil-containing composition could not be tested because it was extremely brittle.

The polyethylene used in Table III was Alathon #1, Du Pont Company, in contrast to the polyethylene used in Table II which was Bakelite's DE–2400 which accounts for some differences in data.

Other silicas have also been employed as fillers to obtain these improved properties. Some of these silicas are listed in Table IV.

TABLE IV
*Tensile Strength and Percent Elongation*

UNIRRADIATED

| Example | Filler | Percent filler based total weight | Rm. temp. T.S. (p.s.i.) | Rm. temp., percent elong. | 145° C. T.S. (p.s.i.) | 145° C., percent elong. |
|---|---|---|---|---|---|---|
| 17 | Santocel-C (Monsanto) | 30 | 1,240 | 0 | 0 | Low |

IRRADIATED (15×10⁶ R.)

| Example | Filler | Percent filler based total weight | Rm. temp. T.S. (p.s.i.) | Rm. temp., percent elong. | 145° C. T.S. (p.s.i.) | 145° C., percent elong. |
|---|---|---|---|---|---|---|
| 18 | Santocel-C | 30 | 1,392 | 0 | 534 | 200–300 |
| 19 | Valron (DuPont) | 30 | | | 307 | 225 |
| 20 | Hisil 101 (Columbia Southern) | 30 | | | 491 | 175–200 |
| 21 | Hisil X303 (Columbia Southern) | 30 | | | 572 | 250–275 |

The polyethylene used in the above determinations was Bakelite's DE–2400 (M.W. 21,000).

Although many other types of fillers have been used, for the sake of brevity, only a few of these are listed in Table V.

TABLE V

*Tensile Strength and Percent Elongation Using Various Fillers*

UNIRRADIATED

| Ex. | Polyethylene | Filler | Percent filler based on total weight | Rm. temp. T.S. (p.s.i.) | Rm. temp. percent elong. | 145° C., T.S. (p.s.i.) | 145° C., percent elong. |
|---|---|---|---|---|---|---|---|
| 22 | Alathon #1 | Clay 33 | 30 | 1,560 | 200 | | |
| 23 | do | Zeolex 20 | 30 | 1,350 | 0 | | |
| 24 | do | Celite 505 | 30 | 1,350 | 0 | | |
| 25 | do | Buca clay | 30 | 1,590 | 200 | | |
| 26 | do | Micromax W6 | 30 | 1,645 | 225 | <18 | 375 |
| 27 | do | Phil Black O | 30 | 1,705 | 150 | <23 | 625 |
| 28 | DYNH | Alon I | 30 | 1,735 | 475 | 0 | 800 |
| 29 | do | Vulcan 9 (Godfrey L. Cabot) | 30 | [1] 2,430 | [1] 0 | | |

IRRADIATED (15×10⁶ R.)

| 30 | Alathon #1 | Clay 33 | | 1,800 | 175 | 152 | 300 |
| 31 | do | Zeolex 20 | | 1,645 | 50 | 138 | 225 |
| 32 | do | Celite 505 | | 1,820 | 0 | 117 | 300 |
| 33 | do | Buca clay | | 1,765 | 225 | 139 | 300 |
| 34 | do | Micromax W6 | | 2,030 | 200 | 280 | 325 |
| 35 | do | Phil Black O | | 2,155 | 200 | 475 | 325 |
| 36 | DYNH | Alon I | | 2,008 | 625 | 340 | 750 |
| 37 | do | Vulcan 9 (Godfrey L. Cabot) | | [1] 2,680 | [1] 250 | 548 | 300-350 |
| 38 | DE-2400 (Bakelite) | Mica (Mineralite Sales Corp.) | | | | 167 | 250 |
| 39 | do | Silene EF (Columbia Southern) | | | | 322 | 100-125 |

[1] Pulling rate=2 inches per minute.

*Yield strength.*—The yield strength of filled polyethylene was also tested at room temperature. Yield strength which may be defined as the stress at which a material exhibits a specified limiting permanent set was obtained during the tensile strength and percent elongation tests by the use of a spark recorder attached to the Scott Tester to record the stress-strain behavior. The yield point was arbitrarily taken at the point of intersection of two lines drawn through the initial elastic strain points and the points of plastic deformation. These results are shown in Table VI.

TABLE VI

*Room Temperature Yield Points*

| Example | Percent aerosil based on total weight | Unirradiated yield points (p.s.i.) | Irradiated (15×10⁶ R) yield point (p.s.i.) |
|---|---|---|---|
| 40 | 0 | 1,390 | 1,430 |
| 41 | 10 | 1,515 | 1,900 |
| 42 | 20 | 1,800 | 1,920 |
| 43 | 30 | Too brittle | 2,200 |
| 44 | 40 | Too brittle | 2,670 |

*Tear strength.*—Tear strengths were determined by using the conventional ASTM approved tear die (ASTM–D624–48 Die C) which yields an unnicked 90° angle sample from the molded sheets. The samples were tested for tear strength using a Scott Tester (Model L–6) at a pulling speed of 2 inches per minute. Tear strength which is reported in pounds per inch is calculated in the usual manner by dividing the pounds of force needed to tear the sample completely by the average thickness of the sample in inches.

In the high temperature tear strength tests a Scott Tester (Model LP) equipped with a high temperature conditioning cabinet (145° C.) and pulling at a speed of 20 inches per minute was used. Each sample was conditioned for 5–10 minutes at 145° C. before being tested. The results are shown in Table VII. The tear strength determinations were carried out according to ASTM procedure D1004–49T.

TABLE VII

*Tear Strength (Pounds per Inch)*

| Example | Percent aerosil | Unirradiated | | Irradiated (15×10⁶ R.) | |
|---|---|---|---|---|---|
| | | Rm. temp. | 145° C. | Rm. temp. | 145° C. |
| 45 | 0 | 579 | 0 | 556 | 27 |
| 46 | 10 | 537 | 0 | 550 | 34 |
| 47 | 20 | 473 | 0 | 506 | 31 |
| 48 | 30 | 274 | 0 | 605 | 90 |
| 49 | 40 | 150 | 0 | 638 | 95 |

*Impact and flexural strength.*—The samples used for impact and flexural strength tests were transfer-molded in a fine cavity Dynstat mold using a Carver press yielding Dynstat test specimens having the following dimension—.375″ x .625″ x .150″. The flexural and impact strength measurements were made using a Dynstat No. 64 testing machine, manufactured by Louis Schopper, Leipzig, Germany, and distributed by Testing Machines, Inc., New York. The flexural strength data was obtained at a 60° angle while the impact strength data was obtained at a 90° drop angle.

TABLE VIII

*Flexural Strength (p.s.i.)*

| Example | Percent aerosil | Unirradiated | Irradiated (15×10⁶ R.) |
|---|---|---|---|
| 50 | 0 | 2,214 | 2,000 |
| 51 | 10 | 2,546 | 2,460 |
| 52 | 20 | 3,060 | 3,174 |
| 53 | 30 | 3,218 | 4,208 |
| 54 | 40 | ([1]) | |

[1] Too stiff and brittle.

TABLE IX
Impact Strength (Foot-Pound)

| Example | Percent aerosil | Unirradiated | Irradiated (15×10⁶R.) |
|---------|----------------|--------------|----------------------|
| 55 | 0 | .542 | .522 |
| 56 | 10 | .586 | .585 |
| 57 | 20 | .666 | .673 |
| 58 | 30 | .557 | .810 |
| 59 | 40 | (¹) | |

¹ Too stiff and brittle.

*Example 60.*—A methylpolysiloxane gum was prepared by heating octamethylcyclotetrasiloxane with 0.02% by weight of tetrabutyl phosphonium hydroxide at 110° C. for about ½ hour and subsequently devolatilized. This gum had a room temperature viscosity of about 500,000 centipoises.

*Example 61.*—A total of 50 grams of polyethylene (Bakelite's DYNH) was milled to a smooth sheet at 120° C. and 50 grams of silicone gum (prepared in Example 60) were added in small pieces. The silicone gum did not appear to mix readily with polyethylene until Aerosil ("Cab-O-Sil") was added to the mix. After a total of 40 grams of silica was added, the sheet obtained from the rolls was pressed for 30 minutes at 160° C. This sheet was given an irradiation dose of $15 \times 10^6$ r. and tested for tensile strength in the manner heretofore described.

TABLE X
Filled Blends

| Temperature | Tensile strength, p.s.i. | Percent elongation |
|-------------|-------------------------|-------------------|
| Room | 1,400 | 200 |
| 145° C | 404 | 300 |

*Example 62.*—In the same manner as above, 50 grams of silicone gum prepared in Example 60 were added to 50 grams of polyethylene (Bakelite's DYNH) on a hot rubber mill and the blend pressed into a sheet. This sheet was irradiated with $15 \times 10^6$ r. and tested for tensile strength in the manner of Example 61 to give the following data:

TABLE XI
Unfilled Blends

| Temperature | Tensile strength, p.s.i. | Percent elongation |
|-------------|-------------------------|-------------------|
| Room | 347 | 200 |
| 145° C | 70 | 200 |

For the above examples, it is evident that the tensile strength of irradiated polyethylene blends is enhanced by the incorporation of fillers. Similarly, many other elastomers capable of being cross-linked by irradiation can be substituted for the silicone gum described in the above example.

From the foregoing, it is apparent that the high energy irradiation of filled polyethylene and polyethylene blends greatly enhances many of the properties of polyethylene and blends thereof, most particularly those properties at elevated temperatures. These products have greater hot strength than the corresponding polyethylene or blend thereof previously known. These properties make irradiated, filled polyethylene and blends thereof particularly adaptable for hot strength films or tapes for electrical insulations, for electrical parts, such as spark plug caps, for household utensils which are used at elevated temperatures, for molded industrial parts, such as jet fuel cartridges, etc., for industrial laminates, for conduits or containers for hot liquids, etc., as well as other uses which will appear to those skilled in the art. Irradiated, filled polyethylene and blends thereof containing conducting carbon blacks are useful as strong but flexible heating pads and tapes. Mixtures of fillers as well as modifying agents, such as dyes, pigments, stabilizers, antioxidants, etc., may be added to the various irradiated filled polyethylene compositions without departing from the scope of the invention.

It will be readily realized that other forms of electron accelerating apparatus may be employed instead of high voltage apparatus 1. For example, linear accelerators of the type described by J. C. Slater in the "Reviews of Modern Physics," vol. 20, No. 3, pages 473–518 (July 1948), may be utilized. In general, the energy of the electrons employed in the practice of the invention may range from about 50,000 electron volts to 20 million electron volts or higher, depending upon the depth to which it is desired to affect the polymeric materials. To decrease wasteful energy absorption between the point of exit of electrons from the accelerating apparatus and the polymeric materials, a vacuum chamber having thin entrance and exit windows may be inserted in the space.

Many other sources of high energy irradiation besides the electron sources described above can also be used in our invention. Examples of such radiation sources are gamma rays, such as can be obtained from $Co^{60}$, "burnt" uranium slugs, fission by-products, such as waste solutions, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, α-particles, fission fragments, such as are available from modern cyclotrons, etc.

What we claim as new and desire to secure by Letters Patent of the United States is:

1. A process of improving the properties of a solid, filler-containing polymer without causing detectable degradation of the surface thereof, said polymer being selected from the group consisting of polyethylene and blends of polyethylene with other polymers, which comprises irradiating said filler-containing polymer while in the solid state with electrons possessing energy within the range of $5 \times 10^4$ to $2 \times 10^7$ electron volts to a radiation dose in the range of $5 \times 10^6$ to $30 \times 10^6$ r.

2. A composition comprising a solid, irradiated filler-containing polymer selected from the group consisting of polyethylene and blends of polyethylene with other polymers said filler-containing polymer having been irradiated with electrons possessing energy within the range of $5 \times 10^4$ to $2 \times 10^7$ electron volts to a radiation dose in the range of $5 \times 10^6$ to $30 \times 10^6$ r. thereby producing a polymer having enhanced properties over that which it possessed prior to irradiation without causing detectable degradation of the polymer surface.

3. A process of improving the properties of a solid, filler-containing polyethylene without causing detectable degradation of the surface thereof which comprises irradiating said filler-containing polyethylene while in the solid state with electrons possessing an energy within the range of $5 \times 10^4$ to $2 \times 10^7$ electron volts to a radiation dose in the range of $5 \times 10^6$ to $30 \times 10^6$ r.

4. The process of claim 3 in which the filler is silica.

5. The process of claim 3 in which the filler is carbon black.

6. The process of claim 3 in which the filler is alumina.

7. The process of claim 3 in which the filler is calcium silicate.

8. A composition comprising a solid, filler-containing polyethylene which has been irradiated with electrons having an energy within the range of $5 \times 10^4$ to $2 \times 10^7$ electron volts to a radiation dose of $5 \times 10^6$ to $30 \times 10^6$ r. thereby producing a polymer having enhanced properties over that which it possessed prior to irradiation without causing detectable degradation of the polymer surface.

9. The composition of claim 8 in which the filler is silica.

10. The composition of claim 8 in which the filler is carbon black.

11. The composite of claim 8 in which the filler is alumina.

12. The composition of claim 8 in which the filler is calcium silicate.

13. A process of improving the properties of a solid, filler containing blend of polyethylene with other polymers without causing detectable degradation of the surface thereof which comprises irradiating said filler-containing blend while in the solid state with electrons having an energy in the range of $5 \times 10^4$ to $2 \times 10^7$ electron volts to a radiation dose in the range of $5 \times 10^6$ to $30 \times 10^6$ r.

14. The process of claim 13 in which the other polymer is an organopolysiloxane and the filler is silica.

15. A composition comprising a solid, filler-containing blend of polyethylene with other polymers said blend having been irradiated while in the solid state with electrons having energy in the range of $5 \times 10^4$ to $2 \times 10^7$ electron volts to a radiation dose in the range of $5 \times 10^6$ to $30 \times 10^6$ r. thereby producing a polymer having enhanced properties over that which it possessed prior to irradiation without causing detectable degradation of the polymer surface.

16. The composition of claim 15 in which the other polymer is an organopolysiloxane and the filler is silica.

17. The process of improving the properties of a solid, filler-containing polymer consisting essentially of polyethylene, which comprises irradiating said solid, filler-containing polymer with high energy, ionizing electron radiation equivalent to about two million electron volts until a total irradiation dosage of $5 \times 10^6$ to $30 \times 10^6$ roentgens is absorbed.

18. The process of improving the properties of a solid, filler-containing polymer consisting essentially of polyethylene, which comprises irradiating said solid filler-containing polymer with high energy ionizing electron radiation until a total irradiation dose of $5 \times 10^6$ to $30 \times 10^6$ r. is absorbed.

References Cited in the file of this patent

UNITED STATES PATENTS 2,316,418    Halgood _____ Apr. 13, 1943

FOREIGN PATENTS 665,262    Great Britain _____ Jan. 23, 1952

OTHER REFERENCES

Smyth: "A General Account of the Development of Methods of Using Atomic Energy for Military Purposes Under the Auspices of the U.S. Government." Page 16, August 11-12, 1945.

Davidson et al.: "J. of Applied Physics," May 1948, vol. 19, pages 427, 429, 430.

Bostwick et al.: "Ind. and Eng. Chem.," vol. 42 (1950), pages 848-9.

Sissman et al.: O.R.N.L. 928, pages 8-20, 78-87 and 93-97; June 29, 1951.

Charlesby: "Proc. Roy. Soc.," (London), November-December, 1952; pages 187-212, A, vol. 215.

Little: "Nature," vol. 170, pages 1075, 1076; December 20, 1952.

Charlesby: "Nucleonics," June 1954, pages 18-25.